US010339691B2

(12) United States Patent
Burgett (10) Patent No.: US 10,339,691 B2
(45) Date of Patent: Jul. 2, 2019

(54) STORAGE OF TIME-VARYING DATA AS PARAMETRIZED FUNCTIONS

(71) Applicant: Mapbox, Inc., San Francisco, CA (US)

(72) Inventor: Damon Burgett, Berkeley, CA (US)

(73) Assignee: Mapbox, Inc., San Francisco, CA (US)

( * ) Notice: Subject to any disclaimer, the term of this patent is extended or adjusted under 35 U.S.C. 154(b) by 0 days.

(21) Appl. No.: 15/728,370

(22) Filed: Oct. 9, 2017

(65) Prior Publication Data

US 2019/0108669 A1    Apr. 11, 2019

(51) Int. Cl.
| *G06T 11/20* | (2006.01) |
| *G06T 13/80* | (2011.01) |
| *G06F 16/29* | (2019.01) |

(52) U.S. Cl.
CPC .............. *G06T 13/80* (2013.01); *G06F 16/29* (2019.01); *G06T 11/206* (2013.01)

(58) Field of Classification Search
CPC ............................ G06T 13/80; G06F 17/30241
See application file for complete search history.

(56) References Cited

U.S. PATENT DOCUMENTS

| 8,742,959 | B1* | 6/2014 | Efros | ................. | H03M 7/3059 |
| | | | | | 341/51 |
| 2003/0125866 | A1* | 7/2003 | Mori | ..................... | G01C 21/26 |
| | | | | | 701/117 |
| 2006/0174209 | A1* | 8/2006 | Barros | .................. | G06F 3/0483 |
| | | | | | 715/764 |
| 2009/0160859 | A1* | 6/2009 | Horowitz | .............. | G06T 11/206 |
| | | | | | 345/440 |
| 2018/0088538 | A1* | 3/2018 | Tian | ....................... | G05B 11/01 |

OTHER PUBLICATIONS

Ratti, Carlo, et al. "Mobile landscapes: using location data from cell phones for urban analysis." Environment and Planning B: Planning and Design 33.5 (2006): 727-748. (Year: 2006).*
Akenine-Moller, Thomas and Eric Haines. "Real-time rendering." 2nd ed. (2002), pp. 715-717. (Year: 2002).*
Vaccari, Andrea, et al. "Pulse of the city: Visualizing urban dynamics of special events." (2010). (Year: 2010).*
Kang, Chaogui, et al. "Analyzing and geo-visualizing individual human mobility patterns using mobile call records." 2010 18th international conference on geoinformatics. IEEE, 2010. (Year: 2010).*

* cited by examiner

*Primary Examiner* — Daniel F Hajnik
(74) *Attorney, Agent, or Firm* — Fenwick & West LLP (57) ABSTRACT

Disclosed is an online system that generates a density map of a particular location based records received from one or more reporting devices. To this end, the online system determines a relationship between time and a raster density for each unit area in a density map. The determined relationship between time and a raster density may be used to store, and transmit records as parameters of a parametrized function.

20 Claims, 5 Drawing Sheets

STORAGE OF TIME-VARYING DATA AS PARAMETRIZED FUNCTIONS

TECHNICAL FIELD

The disclosure relates generally to the field of generating electronic maps and specifically to augmenting electronic maps with time varying raster densities.

BACKGROUND

Geographic information systems can augment maps with raster densities, where raster densities illustrate the time-varying change in the density of reporting devices in a particular location. For example, a large number of user devices may be associated with an area associated with the geographic location of a park only during certain times of the day (e.g., morning, lunch, and evening) and a low number of user devices during other times of the day (e.g., late at night). Such periodic patterns of device density are not efficiently captured in conventional electronic maps.

SUMMARY

An example embodiment of an online system and a method for generating electronic maps for a particular location comprising time varying raster densities is disclosed herein. For example, the online system may include a processor that receives one or more telemetry records from one or more user devices located within the particular area. The received one or more telemetry records includes a location (e.g., longitude and latitude) and a timestamp.

In one or more embodiments, other types of data other than telemetry data may be used and stored in accordance with the description herein, examples of which include weather data (temperature, rainfall) and satellite/drone imagery (and derivatives). Thus, the term records is understood to include these and other types of data that varies both in spatial and time dimensions. Although this description discusses telemetry records as an exemplary embodiment, the teachings herein are applicable to these other kinds of data as well.

In various embodiments, the online system receives an electronic map of the particular location, wherein the electronic map comprises one or more unit areas encompassing a range of longitude and latitude values. For each of the one or more unit areas, the online system determines which of the received one or more records are associated with a reporting device or a user device located within the geographic region encompassed by the unit area. The online system bins each of the one or more records associated with the unit area into one or more time windows.

The online system determines a raster density for each time window based on the number of records in the particular time window. The online system applies various regression techniques to determine a relationship between time and raster density associated with the unit area. In an embodiment, the determined relationship comprises determining a polynomial function. Here, the online system is configured to determine the values of one or more coefficients associated with the polynomial function to best fit determined raster densities.

The online system generates a density map (i.e., a temporal function encoding of gridded data) comprising one or more unit areas of a particular location based on the electronic map and the determined relationship. In an embodiment, each unit area is associated with one or more coefficients associated with the determined function. In other embodiments, online system is configured to generate a time-lapse graphic of the particular location where the time-lapse graphic describes how the raster densities change over time (e.g., throughout the day).

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

I. System Overview

Figure 1:
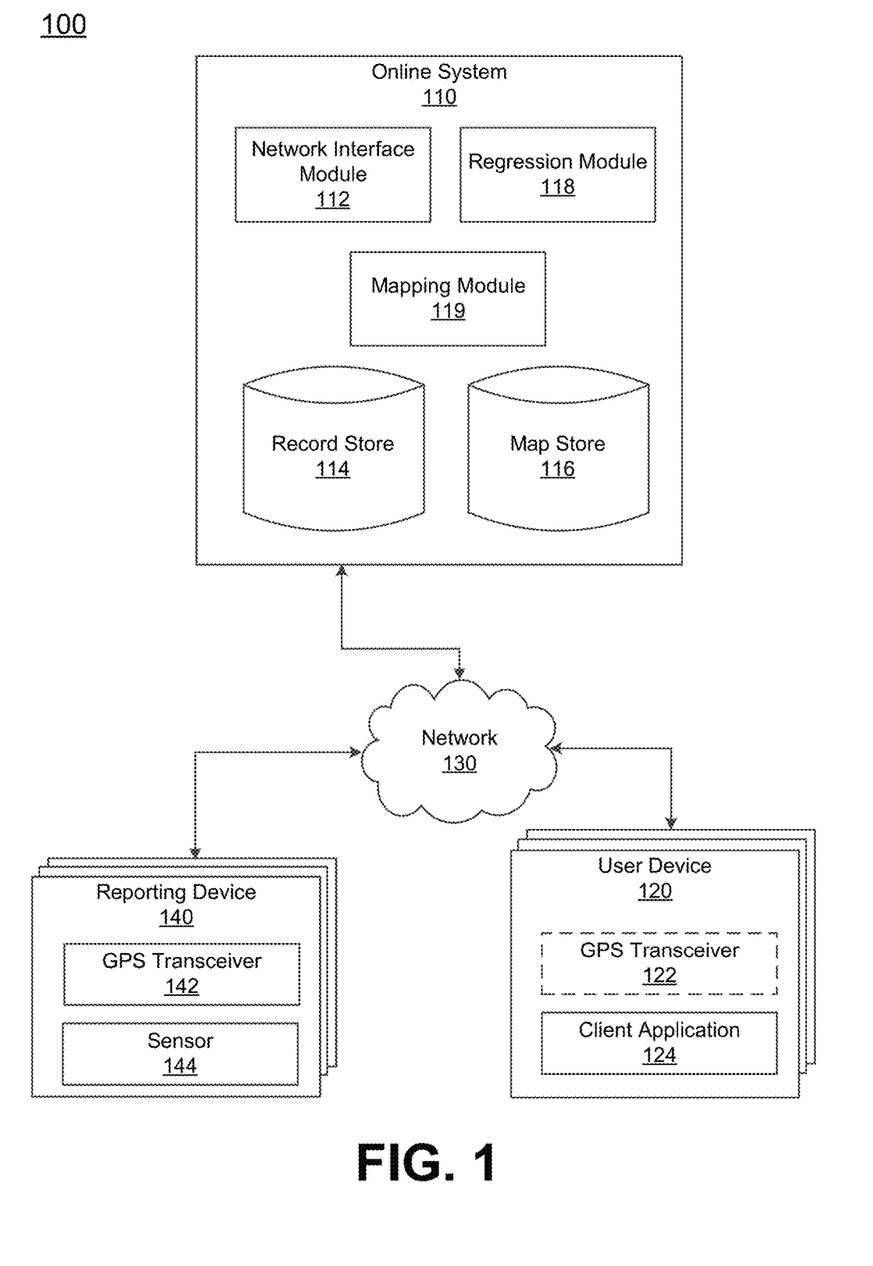
FIG. 1 is a block diagram of a system environment, in accordance with an embodiment.

FIG. 1 illustrates a system environment in which an online system 110 operates, in accordance with an example embodiment. The computing environment of FIG. 1 includes an online system 110, one or more user computing devices (or user device) 120, and a network 130. In various embodiments, the online system 110 and each of the one or more user devices 120 includes additional, fewer, or different components for various applications. Conventional components such network interfaces, security functions, load balancers, failover servers, management and network operation consoles, and the like are not shown as to not obscure the details of the system architecture.

As discussed in the summary, although this description uses the example embodiment of telemetry records to describe processes and systems for storage of time-varying data in a compressed way, other types of data other than telemetry data may be used and stored in accordance with the description herein, examples of which include weather data (temperature, rainfall) and satellite/drone imagery (and derivatives). The teachings herein are applicable to any kind of time-varying data, particularly time varying data that is geographically referenced such that large amounts of similar data are also stored in a same or similar data structure, such that it is advantageous to use the ideas described herein to more efficiently store that data.

I.A. Online System Overview

The online system 110 depicted in conjunction with FIG. 1 includes a network interface module 112, a record store 114, a map store 116, a regression module 118, and a mapping module 119. In other embodiments, the online system 110 may additional or fewer components than those depicted herein. In still other embodiments, the online system 110 is one or more computing devices, for example, servers, work stations, personal computer, wired devices, multi-processor systems, laptops, etc. In other embodiments, the online system 110 is a single server or multiple servers such as a server cluster and the online system 110 is located in one or more physical locations. The online system 110 may also represent one or more virtual computing instances that execute using one or more computers in a datacenter such as a virtual server farm.

The online system 110 stores, in a memory, software, (or computer program product or program code) including a number of code segments for implementing various processes of server systems. For example, the online system 110 includes code segments for receiving records from user devices 120 and/or reporting devices 140. In other example embodiments, the online system 110 may also include code segments for: storing the received records, receiving and storing electronic maps, determining a relationship between time and a raster density for the electronic map, generating a density map based on the electronic map and the determined relationship, and transmitting the density map to user devices 120 via the network 130. The software, including code segments, is comprised of instructions that can be executed by one or more processors of a computing system (or computing device). Here, density information determined by the online system 110 based on one or more records may be referred to as a temptoral function encoding of gridded data.

I.B. Network Interface Module

The network interface module 112 receives requests to provide a density map from the user device 112 via the network 130. In various embodiments, the received request to provide the depth map includes a particular location. For example, the network interface module 112 may receive a request comprising a request to provide a density map of New York City.

The network interface module 112 also receives records from reporting device 140. Generally, the network interface module 112 receives records from an application associated with a user device 120 and/or a reporting device 140 via a network 130. Received records from a user device 120 generally include multiple events (received over the network 130 individually or in groups), where each event generally includes a location (e.g., latitude and longitude) where the user device 120 was located at an associated timestamp. The reporting device 140 may be stationary at a known location, and each event received from the reporting device 140 associated with a predetermined location (e.g., latitude and longitude). Here, records received from a reporting device 140 include a timestamp that indicates a time when the event occurred, an event status (e.g., inches of collected rainfall since the last report, current temperature, etc.), and a unique identifier associated with the reporting device.

The network interface module 112 is further configured to parse received records into individual events (e.g., location/timestamp pairs or event status/timestamp pairs). The network interface module 112 communicates with the record store 114 and stores the parsed records. For example, a parsed record associated with the received event notification is stored as a <key, value> pair. For example, a key is a timestamp and a value is the location associated with the record. In another example, a key is a timestamp and a value is an event status associated with the record. Storage schemes are further described below in conjunction with the record store 114.

The network interface module 112 is communicatively connected to the record store 114, the map store 116, and mapping module 119 through a computer network. Computer networks may include any combination of wired and wireless networks such as a Local Area Network (LAN), a Wide Area Network (WAN), one or more internetworks such as the public Internet, or a company network.

In one embodiment, the network interface module 112 comprises a programmatic interface such as Java Database Connectivity (JDBC) or Open Database Connectivity (ODBC) for communicating with record store 114 and map store 116. In other embodiments, the network interface module 112 may communicate with any number of databases and any type of database, in any format. For example, the network interface module 112 may be a piece of customer software created by an entity associated with the online system 110, or may be created by a third-party entity in part or in whole.

I.C. Record Store and Map Store

The record store 114 and map store 116 include programs and data that is stored on any suitable storage device such as hard disk drives, solid state drives, random access memories, or any other electronic digital data recording device configured to store data. Although the record store 114 and the map store 116 are depicted as a single database in FIG. 1, the record store 114 and the map store 116 may span multiple devices located in multiple physical locations. For example, the record store 114 and the map store 116 may include one or nodes located at a data warehouse(s). Additionally, in one embodiment, record store 114 and the map store 116 may be located on the same device(s) as the online system 110. Alternatively, the record store 114 and the map store 116 may be located on a separate device(s) from the online system 110.

In various embodiments, the record store 114 and the map store 116 may be in any format, such as a relational database, a NoSQL database, or any other format. The record store 114 and map store 116 may be communicatively connected with the online system 110 via the network interface module 112 through any kind of computer network using any combination of wired and wireless communication.

The record store 114 stores records captured from the user devices 120 and reporting devices 140. As discussed above, the records include location and event data associated with individual user devices 120 and reporting devices 140. Here, records may include geographical locations and associated timestamps. In an example embodiment, a key is a spatial location associated with a user device 120 and the value is the current time associated with the received records. For example, a received record from a user device 120 comprises a time of "9:15 AM" with a spatial location of "51.662302° W, 21.763321° N." In this example, the record store 114 stores the received record as <−51.662302, 21.763321,15,1481833678000>. The record store 114 may also store additional information in records such as bearing, speed, and a system time associated with when the record was received by the online system 110. Examples of such additional data include, but are not limited to, a unique identifier shared by all events associated with a given trace of such events, and/or a unique device identifier.

Alternatively or additionally, records may include a device identifier associated with a reporting device 140, an event status, and a timestamp associated with the event status. Here, the record store 114 may store a geographic location associated with a device identifier and the record store 114 is configured to match a received device identifier with a geographic location. In an example embodiment, a key is a spatial location and a value is an event status. For example, a received record comprises a time of "9:15 AM," a device identifier mapping to a spatial location of "51.662302° W, 21.763321° N," and an event status of "5 inches of rain." In the previous example, the record store 114 stores the received record as <51.662302° W, 21.763321° N, 9:15, 5>. Here, "51.662302° W, 21.763321° N" is a latitude and longitude associated with a geographic location, "9:15" is a timestamp, and "5" is a device identifier. Examples of event statuses stored by the record store 114 include one or more of (but are not limited to): the number of inches of rain fall inches of collected rainfall since the last report, current temperature, and other substantive sensor data recording other physical measurements. Generally, sensor data stored by the record store 114 includes information describing the physical environment reported by a reporting device 140.

The map store 116 stores electronic map data. The electronic map data may be obtained, downloaded, or otherwise received from a variety of sources, for example it may be provided to the online system 110 either directly or indirectly via an application programming interface (API). Example data sources include National Aeronautics and Space Administration (NASA), United States Geological Survey (USGS), and DigitalGlobe. Digital map data may also be defined by a user and uploaded to the online system 110. In various embodiments, digital map data may be updated at any suitable interval, and may be stored for any amount of time. For example, the map store 116 obtains digital map data from a data source at periodic intervals (e.g., once a day, once a month, once a year, etc.).

Digital map data may include, among other items of information, any one or more of satellite images, digital street (road) data, building or place data, or terrain data. Digital street data may, for example, include road names, place names, and house numbers.

In one implementation, the electronic map data comprises an array of unit areas configured to enable efficient cashing, scaling, and serving maps to one or more user devices 120. Each unit area in the array of unit areas is associated with a particular geographic area. For example, an array of unit areas comprising an electronic map of San Francisco may be a square area of 23 million square meters (e.g., 4891 meters by 4981 meters), and each individual unit area may be a square area of 5800 square meters (e.g., 76 meters by 76 meters). Each unit area is associated with a range of geographical coordinates, such as longitude and latitude values.

The stored electronic map data may be rendered into a viewable image when requested by any one of the user devices 120 via an API or software developer's kit (SDK).

I.D. User and Reporting Device

The user device 120 is a computing device. The user device 120 may be configured as a reporting device 140 configured to generate and transmit telemetry or other data to the online system 110 via the network 130. In one or more embodiments, a user device 120 optionally includes a global positioning system (GPS) transceiver 122 and a client application 124.The user device 120 may additionally include a display and is configured to receive user input, receive electronic map data, and display the received electronic map data. In these embodiments, the user device 120 may be any mobile device such as a hand-held computer, a wearable computer, a cellular or mobile phone, a portable digital assistant (PDA), tablet computer, and the like.

The GPS transceiver 122 determines location data indicating a GPS coordinates of the user device 120. The GPS transceiver 122 determines the GPS coordinates of the user device 120 by communicating with a satellite (not shown). In addition or alternative to GPS coordinates, the location data may be generated based on local cellular, Wi-Fi, Bluetooth, and/or cell tower triangulation. Multiple techniques for gathering location data may be used to improve the accuracy spatial locations defined by the location data. The user device 120 transmits the location data to the client application 124 to facilitate determination of spatial of location of captured images.

The reporting device 140 is computing device configured to report data about its surround environment to the online system 110 via the network 130. Reporting devices 140 include a GPS transceiver 142, and a sensor 144. Here, a GPS transceiver 142 is an embodiment of GPS transceiver 122 described above and sensor 144 is any device that detects and responds to some type of input from the physical environment surrounding the reporting device 140. Examples of sensors 144 include, but are not limited to, rainfall, temperature, air quality, and seismic sensors. Other examples of sensors 144 include various types of force/weight detectors, torque, stress and strain sensors, etc. Examples of different types of reporting devices 140 include, but are not limited to, a vehicle such as a car, a boat, plane, or other in-vehicle or dongle, non-person trackers lacking a display that might be attached to a package for example (e.g., an RFID tag meant to be read by an associated reading device), weather stations that record weather information, etc. In other embodiments, reporting devices 140 are low-power devices (e.g., Internet of things (IoT) devices). Reporting devices 140 may vary widely from each other, and can be as various as cars, boats, planes, or other vehicles, devices attached to dongles, RFID or other tracking elements associated with corresponding scanning devices (e.g., tags attached to packages or crates), etc.

Reporting devices 140 may be configured to communicate with the online system 110 when an event status changes. Generally, some user devices 120 are reporting devices 140 but not all user devices 120 are (necessarily) reporting devices 140 and vice versa. For example, a user device 120 able to view an electronic map generated according to the techniques described herein may be a desktop computer that itself is not a reporting device. If the map contains weather information generated according to previously captured data stored as described herein using parameters, the user device 120 may be able to display the map, but may not be responsible for the reporting of the data that was used and compressed to store the data representing the map. Similarly, if a weather station reported the data for the map, the weather station may have no display functionality to reproduce map based on the stored parameters that were generated based on the reported data.

The client application 124 allows the user of the user device 120 to interact with the online system 110 via the network 130. In some embodiments, the client application 124 is software that displays, uses, supports, or otherwise provides electronic mapping functionality as part of an application or software. For example, the client application 124 is any type of application, such as a taxi service, a video game, a chat client, a food delivery application, etc. In an embodiment, the client application 124 is a mapping application that obtains electronic mapping functions through a SDK associated with the online system 110. Here, the SDK implements functional calls, callbacks, methods, or other programmatic means for contacting the online system 110 to obtain digital map tiles, layer data, raster densities, or other data that can form the basis of visually rendering a received density map as part of the client application 124. In various example embodiments, the client application 124 is a browser application that enables interaction between the user device 120 and the online system 110 via the network 130. In other embodiments, the client application 124 interacts with the online system 110 through an API running on a native operating system associated with the user device 120. The native operating system provides an interface between the hardware components of the user device (e.g., GPS transceiver and user input interface) and software (e.g., app 132) that executes through the operating system. For example, the laptop or desktop computer system may have a WINDOWS, MAC, or LINUX based operating system. Further by example, the mobile computing devices may have IOS®, ANDROID™, or other similar operating system.

The network 130 may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, Wi-Fi, worldwide interoperability for microwave access (WiMAX), 3G, 4G, 5G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML), HTTP Secure (HTTPS) or extensible markup language (XML). In some embodiments, all or some of the communication links of the network 130 may be encrypted using any suitable technique or techniques.

II. Regression

Regression module 118 determines a relationship between time and raster density by fitting a function to records within a determined time window for each unit of area in the digital map data. Here, raster density can refer to a count of the number of individual events within the identified records, across multiple devices, for each such unit area and for each unit of time within the time window. However, a record may also include a measurement from a sensor 144 associated with a reporting device 140. For example, a received record may be the amount of rainfall collected by the reporting device 140 since the last report, or a current temperature, or an image associated with a particular spatial location. In these examples, raster density refers to a raw or processed interpretation of the various event statuses received from the reporting device 140, usually within a geographic area and within some time period. For example, a raster density may represent a raw amount of rainfall collected, or as another example a normalized (e.g., average) amount of rainfall collected by a sensor associated with a reporting device 140 during a window of time. The regression module 118 is configured to determine a relationship between the received event status information, regardless of whether it is in the form of "occurrence" related data, raw, and/or processed sensor data, or some other form. Generally, density information determined by the regression module 118 is a temporal function encoding of gridded data.

By identifying a function that best fits the records, the records themselves can be compressed and ultimately replaced in storage. That is, by identifying a function that best fits the records, records are represented based on the function's parameters rather than the underlying data itself. This allows for significant data storage space savings when storing significant amounts of record information, and also makes it easier to work with record information for use in the online system 110 or on the user device 120.

The regression module 118 receives a time window and a number of records having timestamps during the time window. Example time periods associated with the time window may, for example, be a period of a single hour or a few hours, a period of 24 hours (day), or multiple days (e.g., a week). The records are further localized to a particular unit area. The range of longitude and latitude values may be predetermined, or they may be retrieved from an electronic map from the map store 116, by extracting a range of longitude and latitude values from each unit area of an array associated with the electronic map, and retrieving records associated with the range of longitude and latitude values within the time window. For example, to determine the parameters for a particular unit area in San Francisco on Tuesday May 24, 2017 from 9:00 AM-10:00 AM, the mapping module 119 retrieves a map of San Francisco from the map store 116. For each unit area in the array associated with the retrieved electronic map, the mapping module 116 extracts a range of latitude and longitude values. Here, the range of latitude and longitude values and the particular time window are used to retrieve records from the record store 114. Time windows are further described below in Section III conjunction with the mapping module 119.

The regression module 118 may pre-divide the electronic map into a number of blocks. Here, each of the plurality of blocks is delineated by a range of longitude and latitude values. The regression module 118 sorts each of the one or more received records into one of the plurality of blocks based on the range of longitude and latitude values associated with the blocks. For example, a record associated with a spatial location <0.15234° E, 84.20853° N> is sorted into a conventional square block of zero to one degrees longitude and 84 to 85 degrees latitude with conventional bounding box ordering of <W, S, E, N> lines of the box. The range of coordinates associated with each block of the electronic map may be adjusted based on a zoom level associated with the electronic map. This improves efficiency by having data sorted on receipt, and so that processing by the regression module 118 does not need to lookup data by location and can instead process blocks in sequence using the pre-divided data.

The mapping module 119 then combines the retrieved records for each unit area into a number of time buckets wherein each time bucket is associated with a time window. For example, returning to the example above, if a time window has a length of 5 minutes, the retrieved records may be binned into twelve separate five minute intervals. Time windows and bins can comprise any arbitrary duration. The mapping module 119 determines a number of records in each time bucket and generates a time vector based on the determined number of records in each time bucket. The length of the time vector is the number of time buckets and the values of the elements of the vector are the count of the number of records (events) captured during each bin's associated time window.

The mapping module provides the generated time vector for each unit area to the regression module 118 and receives in response a function describing the determined relationship between time and raster density associated with that pixel including a vector of the coefficients of the function. The process described above may be repeated for each unit area in an array associated with the retrieved electronic map.

As introduced above, determining a relationship between time and the raster density includes determining that the raster density is some function of time. Some example functions that may describe a relationship between time and raster density include: linear functions, quadratic functions, power functions, polynomial functions, rational functions, exponential functions, logarithmic functions, and sinusoidal functions.

The regression module 118 determines a relationship between raster density, again per unit area, and time by performing a regression on the number of events in the received time window, or based on whatever other data is stored for each time bin per unit area. In the case of data where the reporting devices are in motion, the number of events recorded or sensor data recorded in the records from multiple devices will change as a function of time, as reporting devices travel into and out of the real world location associated with each unit of area of the unit area for which the regression is being determined. This may not happen, for example, if the reporting devices are stationary items such as weather stations.

The regression module 118 determines the particular function used for the regression on a per-regression basis. For example, the order of the polynomial of the function to be used to describe the relationship is based on a determined residual associated with the regression and may be dynamically changed for each regression. Here, a residual describes a difference between a raster density predicted by the determined function and a raster density determined from the one or more received records. For example, if the residual between a raster density predicted by a $2^{nd}$ degree polynomial is above a threshold level, the regression module performs a regression using a $3^{rd}$ degree polynomial. In an embodiment, the process described in conjunction with the preceding example is repeated with higher degree polynomials until the determined residuals are below a threshold value.

The regression module 118 may perform a regression by applying one or more of a least-squares estimation technique (e.g., ordinary least squares, generalized least squares, percentage least squares, iteratively reweighted least squares, instrumental least squares, optimal instruments, and total least squares), maximum-likelihood estimation techniques (e.g., maximum likelihood estimation, ridge regression, least absolute deviation, and adaptive estimation), and other estimation techniques (e.g., Bayesian linear regression, quantile regression, mixed models, principal component regression, least-angle regression, and Theil-Sen estimation). In other embodiments, the regression module 118 performs a non-linear regression to determine the relationship between time and raster density.

The regression module 118 provides the determined relationship between time and raster density to the mapping module 119. This may take the form of providing the determined function, such as a vector of parameters of the function, such the coefficients of the function. This vector of parameters is also referred to herein as the coefficient vector. For example, if a function describing the determined relationship is a quadratic function of the form $y=a*t^2+b*t+c$ where y is the raster density, t is a time, and the coefficients a, b, c are constants, then the generated vector has a length of three and each element of the vector is the value a constant (e.g., a, b, or c). The vector of parameters is stored by the regression module 118. In an embodiment, the regression module stores the vector of parameters in a data store associated with the regression module 118. The provided relationship may further include the form of the function associated with the vector of parameters, particularly if the function changes from unit area to unit area.

The regression module 118 may also filter the coefficients of the function describing the determined relationship based on a thresholding function. In the preceding example, if the values of a coefficient (e.g., one of a, b, or c), is below a threshold value, then the regression module 118 determines that the value of the coefficient is 0. The advantage of filtering is to further reduce the amount of data needed to store the compressed representation of the records by removing those sets of parameters where the raster density is sufficiently low so as to not merit maintaining. Although storing only a few parameters per unit area of a unit area for each time window is significantly compressed relative to storing individual records for areas with a significant number of events, in areas where there are comparatively few events, the "parameterization" of the these records may not reduce the total data taken up, and may instead increase it. This is particularly the case, again using the telemetry example, for large rural areas that may only be lightly trafficked, or sections of water or other geographic areas where no traffic is practical/expected. In these instances, the tradeoff of the loss of information regarding raster density as a function of time is made up for by significant savings in total memory required to store data for a given unit area and/or for a set of many unit areas. In an area with no variation, a raster storage format (e.g., GeoTIFF with LZW compression) can take advantage of the lack of variation to more efficiently compress the data.

III. III. Example Density Maps

Figure 2A:
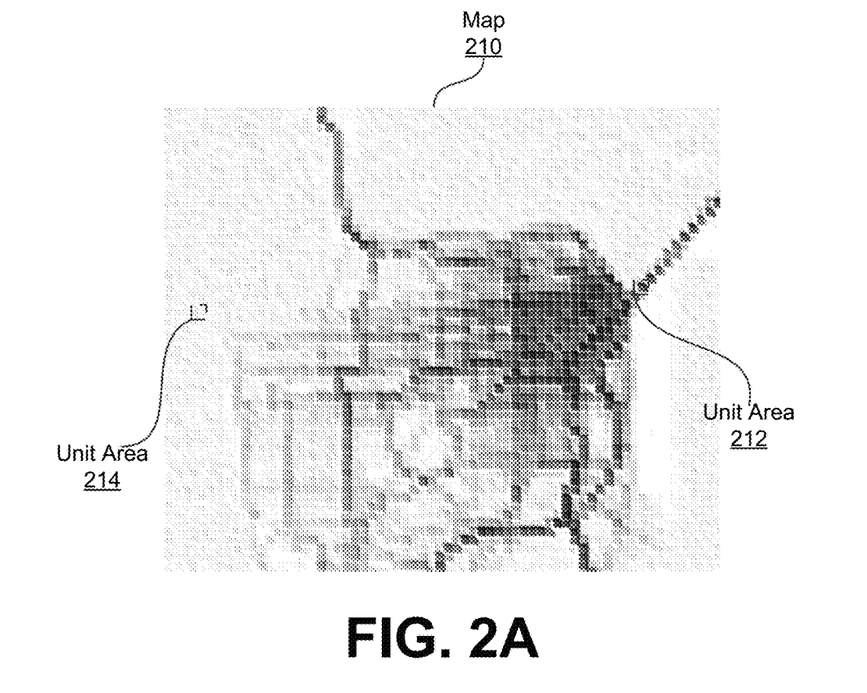
FIG. 2A is an example density map at a particular time of day in accordance with an embodiment.

FIG. 2A is an example density map 210 at a particular time of day, in accordance with an embodiment. The density map 210 includes a number of unit areas wherein each unit area is associated with a raster density. In the following examples, each unit area encloses one unit area for purposes of relation to the discussions of Sections II and III, such that each of the unit areas in the density map 210 encloses a geographic area associated with a physical location. In FIG. 2A, the unit areas are illustrated with grayscale value between 0-100 indicating the raster density associated with the unit area at the particular time of day. Here, a grayscale value of 0 corresponds to a lighter unit area while a value of 100 corresponds to a darker unit area. The darker the unit area the larger the number of events from reporting devices 140 in the geographic area encompassed by the unit area during that time bin within the time window.

The density map 210 comprises a unit area 212 and a unit area 214. As depicted in FIG. 2 the unit area 212 encloses a geographic area associated with the Bay Bridge and the unit area 214 encloses a geographic area associated with the Pacific Ocean.

Figure 2B:
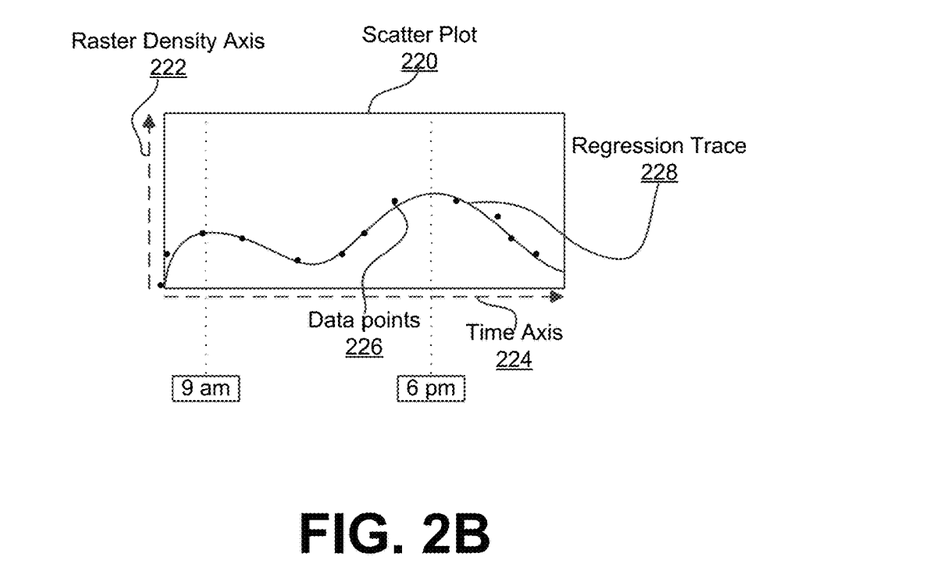
FIG. 2B depicts an example two-dimensional scatter plot of the time dependence of a unit area depicted in FIG. 2A, in accordance with an embodiment.

FIG. 2B depicts an example two-dimensional scatter plot 220 of the time dependence of unit area 212. The scatter plot 220 shows raster densities for unit area 212 plotted against a time axis 224. In FIG. 2, the scatter plot 220 comprises 12 data points 226 and a regression trace 228 Each of the 12 data points 226 represents raster densities of reporting devices 140 in a geographic area covered by unit area 212 over a particular time window. In FIG. 2, each data point of the 226 is associated with a time window of 1 hour. For example, a data point of the data points 226 represents the raster density of unit area 212 at a time window associated with the period of 9-10 am, and the time axis 224 represents 12 hours. In other embodiments, each of the data points 226 may be associated with different time windows, and the time axis 224 may span different period of time (e.g., a full day). The regression trace 228 is line of best fit representing the relationship between the time axis 224 and raster density axis 222 of unit area 212, in this case a polynomial function with coefficients (e.g., a, b, and c) determined by the regression module 118.

IV. Example Storage Schemes and Methods

Figure 3:
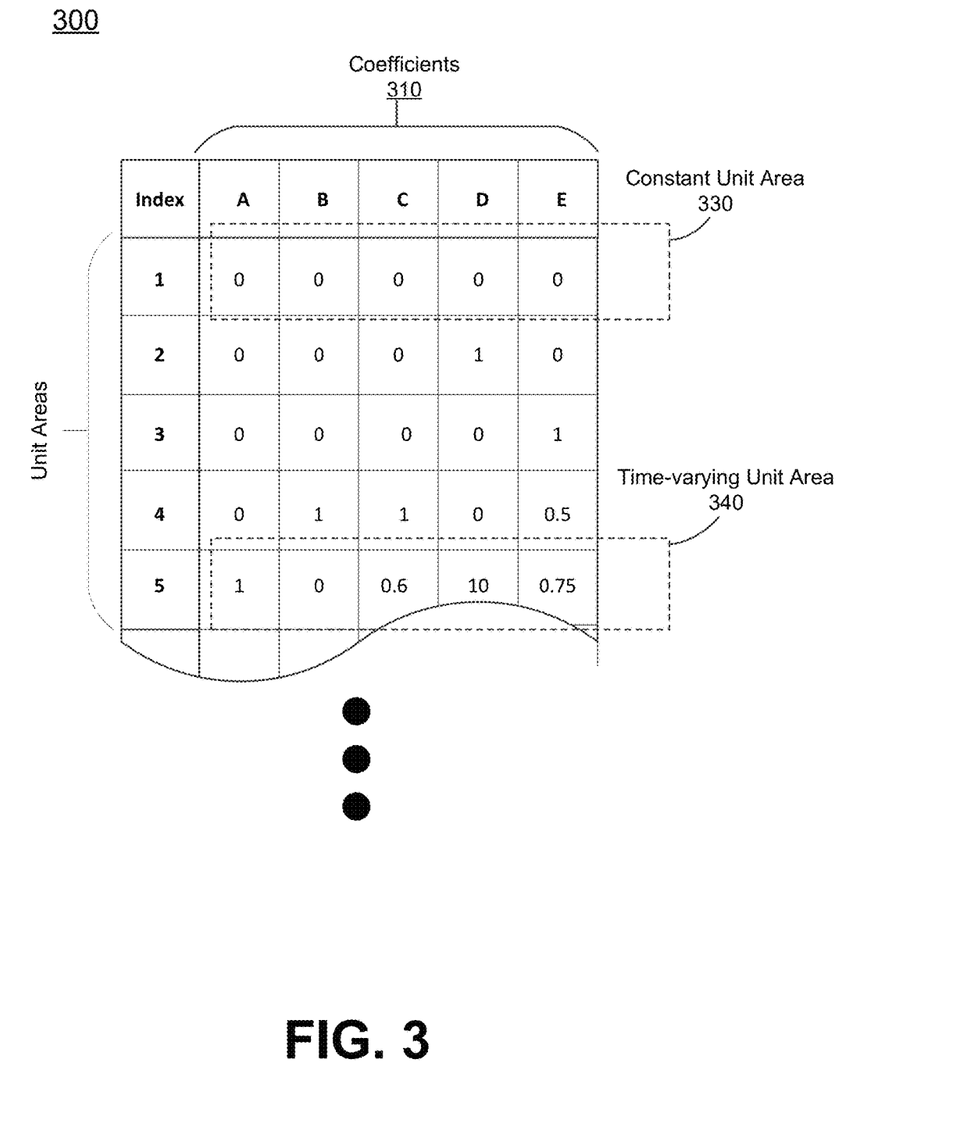
FIG. 3 is a diagram of a representative time-dependent density table, in accordance with an embodiment.

FIG. 3 is a diagram of a representative table 300 used for storing the determined relationship between time and raster density for each vector in a density map, in accordance with an embodiment. The columns of table 300 comprise coefficients 310 of a function describing the determined relationship between time and a unit area. The rows of table 300 comprise unit area indices 320. A static example record 330 stored in table 300 illustrates time varying data for a unit area that is not associated with a raster density that varies in time (e.g., a unit area encompassing a lake). A time-varying unit area 340 illustrates time varying data for a unit area that is associated with a raster density that varies in time (e.g., a unit area encompassing a freeway).

The structure illustrated in FIG. 3 provides for the efficient storage of time-varying data raster density data, and more importantly, significantly compressed storage relative to the storage requirements of storing records in event form. In FIG. 3, each row represents a determined relationship of a unit area and is associated with 5 coefficients 310. Here, the number of coefficients stored in table 300 are based on the number of coefficients of the function used during regression. Therefore, depending on the type of function use the table 300 may include additional or fewer coefficients 310 than those depicted in conjunction with FIG. 3. The number of columns may also be dynamically allocated to each unit area of the row of unit areas 320. That is, each row of unit areas 320 in table 300 may be different size based on the number of coefficients 310 used to represent the time variability associated with the unit area associated with the row. For example, the static example record 330 is represented by just 1 column of coefficients 310. On the other hand, a unit area with a significant time variable raster density may be associated with a number of coefficients 310. For example, the time-varying unit area 340 is represented by 5 columns of coefficients 310.

The table 300 may include an additional column storing an identifier for the function representing the determined relationship. For example, in FIG. 3 constant unit area 330 represents the coefficients of sinusoidal function while time-varying unit area 340 represents the coefficients of a polynomial function. In the preceding example, a client application (e.g., client application 124) receives an electronic map from the online system (e.g., online system 110) including the table 300. The client application 124 is configured to generate a density map based on the received electronic map and the generated table 300.

Figure 4:
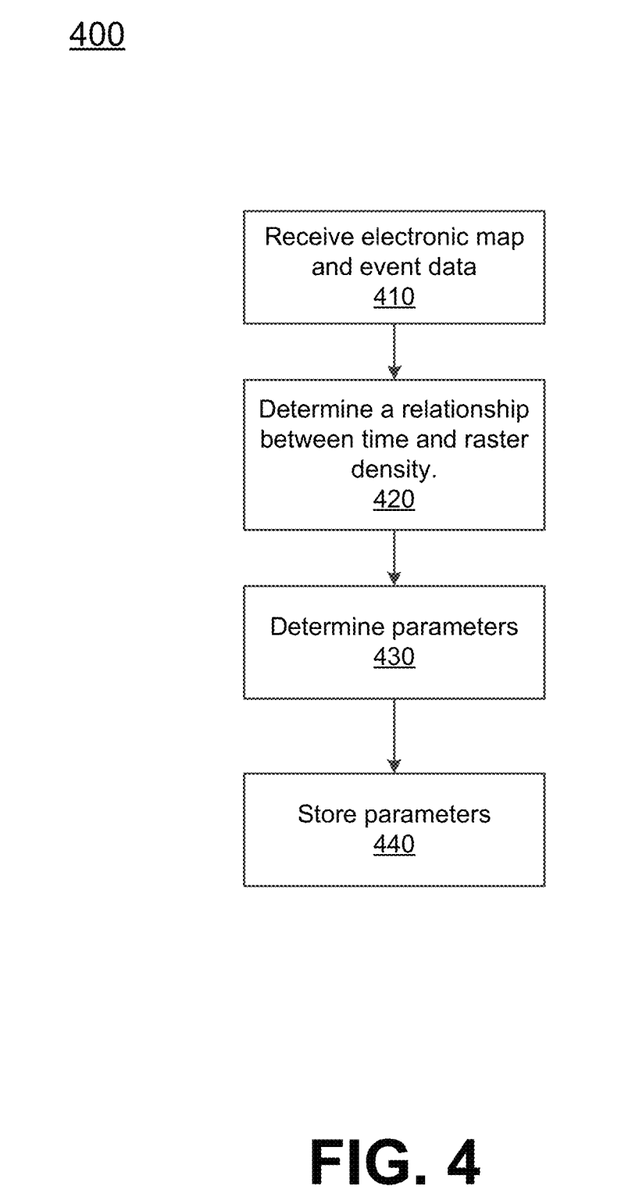
FIG. 4 is a flow chart of a process for generating and storing time-varying data as parameters of a parameterized function, in accordance with an embodiment.

FIG. 4 is a flow chart of a process for generating time-varying density parameters, in accordance with an embodiment. The process begins when the online system 110 receives 410 electronic map data and records of event data including geographic locations, timestamps, and some item of information (e.g., presence in the case of telemetry data, weather information, etc.). The online system 110 determines 420 a relationship between time and raster density for each of the plurality of unit areas associated with an electronic map of the requested geographic area. The online system 110 determines 430 parameters 440 a density map of a particular geographic location. The online system stores 440 the determined parameters in a table or other similar data structure.

V. Mapping and Example Methods

Figure 5:
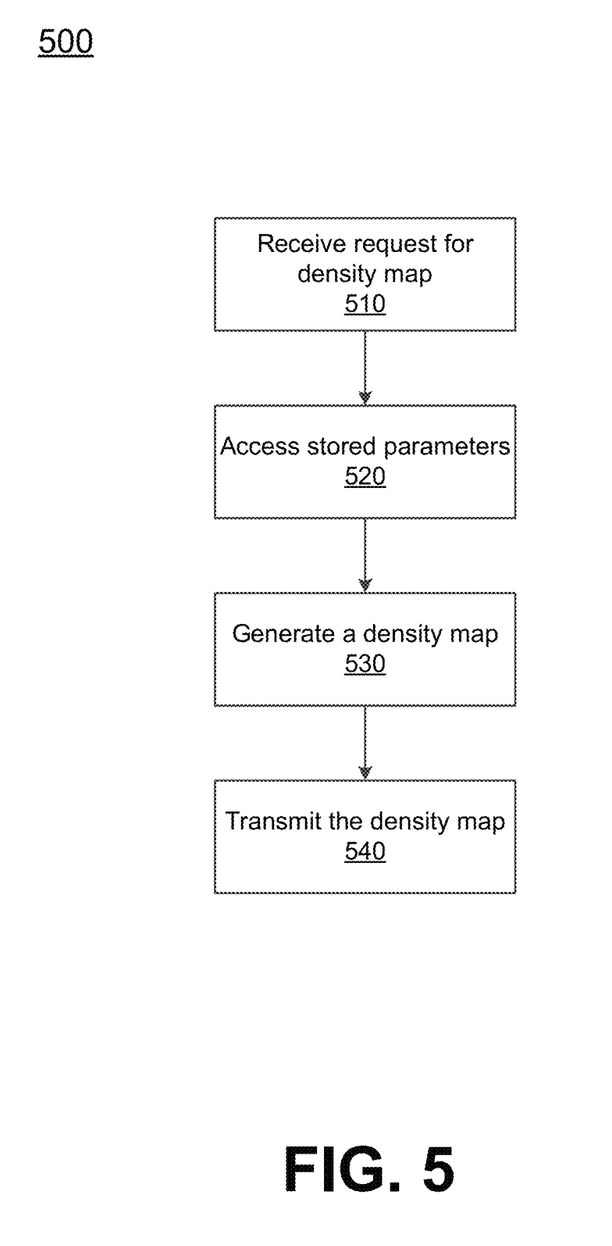
FIG. 5 is a flow chart of a process of generating and transmitting a density map of time-varying density information, in accordance with an embodiment.

Returning now to FIG. 1, the online system 110 and mapping module 119 is configured to generate representations for entire maps including arrays of such compressed representations as described above in section II in conjunction with the regression module 118. FIG. 5 is a flow chart of a process for generating and transmitting a density map of time-varying density information, in accordance with an embodiment. The process begins when the online system 110 receives 510 request for a density map from user devices 120 via the network 130. The received request 510 includes a geographic location and a time frame. The online system 110 accesses 520 a set of parameters for each of the plurality of unit areas associated with an electronic map of the requested geographic area.

The online system 110 generates 530 a density map based on the accessed parameters, and one or more functions associated with the parameters. The mapping module 119 combines the functions and parameters to generate a density map that defines the time-varying raster density of each unit area in the array of unit areas associated with the requested map. The generated map may be static, for example it may show the event information as determined by the parameters and associated functions with respect to each unit area in the map for a particular instant in time within the specified period. Alternatively, the map may be a dynamic graphic that shows the event information as determined by the parameters and associated functions with respect to each unit area in the map for each of a number of instants in time, for example by progressing through the time window in increasing or decreasing time order, where the displayed information in each unit area is determined different for each instant in time.

As an example, for a unit area where raster density is quadratically related to time would include a vector comprising 3 elements (e.g., values for coefficients $c_1$, $c_2$, and $c_3$ associated with the polynomial function $y=c_1*t^2+c_2*t+c_3$ where y is the raster density and t is the time). The mapping module 119 could be configured to associate red, green, blue (RGB) values with the raster densities for each unit time/unit area. For example, the mapping module 119 may generate density map having a unit area colored red during times of the day with the raster density is high. The mapping module 119 may provide a density map for display, for example through the client application 124 of a user device. In addition to generating a density for purposes of display, the mapping module 119 may further store the generated density map in a table where each unit area within each unit area is associated with coefficients associated with a function describing the determined relationship between time and the raster density of each of the plurality of unit areas comprising a density map.

The online system 110 transmits 540 the generated density map to the user device 120 for display. In various embodiments, the transmitted density map is rendered for display on the user device 120 by a client application 124.

Transmitting 540 the density map may include generating a time-lapse video over a number of time periods based on the determined relationship of each unit area. For example, a client application 124 may calculate a time-varying raster density associated with each of a plurality of unit areas associated with a density map. Alternatively, or additionally, the online system 110 calculates a time-varying raster density for each of a plurality and generates a time-lapse video over a number of time periods based on the determined relationship. The online system 110 may transmit 450 the generated time-lapser video to a user device 120. For example, the calculated raster densities may be used generate an animation (e.g., Graphics Interchange Format (GIF)) describing how traffic patterns change during the course of hours, days, or weeks.

VI. Additional Considerations

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the described subject matter. Accordingly, the disclosure of the present disclosure is intended to be illustrative, but not limiting, of the scope of the disclosed configuration, which is set forth in the following claims.

What is claimed is:

1. A method comprising:
   for a geographic area comprising a plurality of unit areas subdividing the geographic area:
      receiving records obtained from a plurality of reporting devices when the reporting devices were located within the geographic area, the records including the unit areas in which the reporting devices were located and time stamps indicating when the reporting devices were located in those unit areas;
      determining, for each of the plurality of unit areas, a relationship of raster density of the unit area as a function of time in a time window, wherein the raster density represents a density of records within the unit area and the relationship is represented by a vector of parameters each corresponding to a respective coefficient of the function;
      generating a table, wherein each row of the table corresponds to a respective one of the plurality of unit areas, and each column of the table corresponds to a respective coefficient of the functions;
   for at least one of the plurality of unit areas:
      determining that a particular coefficient of the function is below a threshold coefficient value, and
      responsive to determining that the particular coefficient is below the threshold coefficient value, performing at least one of setting the particular coefficient to zero and deleting the particular coefficient from the table; and
   storing the determined table.

2. The method of claim 1, wherein the determined relationship is defined by one of a linear function, a polynomial function, and a sinusoidal function.

3. The method of claim 1, wherein determining the relationship comprises:
   determining a number of time bins within the time window;
   for each of the number of time bins, generating a raster density associated with the unit area;
   generating a vector, wherein the length of the vector is the number of generated time bins, and each of the elements of the vector comprises the generated raster density associated with the time bin; and
   performing a regression to determine the function that describes the relationship between the time and the raster density based on the generated vector.

4. The method of claim 1, wherein a number of columns in the table dynamically allocated for each row of the table are based on, at least, the number of coefficients of the function of the unit area associated with the row.

5. The method of claim 1, further comprising:
   receiving, from a user device, a request to generate a density map of a particular location in the geographic area; and
   generating an electronic map including the particular location based at least in part on the stored table.

6. The method of claim 5, further comprising transmitting the generated electronic map for display to the user device.

7. The method of claim 1, wherein the determined relationship is a polynomial function and determining the order of the polynomial comprises selecting a polynomial and iteratively performing steps comprising:
   determining a regression using a selected function; and
   responsive to determining that resultant residuals associated with the regression are greater than a threshold value, selecting a higher order polynomial, wherein the higher order polynomial is different from the selected polynomial; and
   responsive to determining that resultant residuals associated with a final regression are less than the threshold value, selecting a second polynomial for determining a final regression.

8. The method of claim 1, further comprising:
   calculating, for each of the plurality of unit areas, a time-varying raster density based on a row in the stored table associated with the unit area; and
   generating a time-lapse graphic for the geographic area using the calculated time-varying raster densities.

9. The method of claim 1, wherein storing the determined table comprises:
   for each row in the table:
      vectorizing the coefficients in the row to produce a coefficient vector; and
      compressing the coefficient vector based on at least one of a deleted coefficient and a coefficient set to zero; and
   storing each compressed coefficient vector in conjunction with the corresponding unit area.

10. A system comprising:
    a processor; and
    a memory comprising stored instructions, the instructions executable by the processor or cause the processor to:
       for a geographic area comprising a plurality of unit areas subdividing the geographic area:
          receive records obtained from a plurality of reporting devices when the reporting devices were located within the geographic area, the records including the unit areas in which the reporting devices were located and time stamps indicating when the reporting device were located in those unit areas;
          determine, for each of the plurality of unit areas, a relationship of raster density of the unit area as a function of time in a time window, wherein the raster density represents a density of records within the unit area and the relationship is represented by a vector of parameters each corresponding to a respective coefficient of the function;

generate a table, wherein each row of the table corresponds to a respective one of the plurality of unit areas, and each column of the table corresponds to a respective coefficient of the functions;

for at least one of the plurality of unit areas:
- determine that a particular coefficient of the function is below a threshold coefficient value, and
- responsive to determining that the particular coefficient is below the threshold coefficient value, perform at least one of setting the particular coefficient to zero and deleting the particular coefficient from the table; and store the determined table.

11. The system of claim 10, wherein the instructions to determine the relationship further comprise instructions that when executed by the processor cause the processor to:
determine a number of time bins within the time window;
for each of the number of time bins, generate a raster density associated with the unit area;
generate a vector, wherein the length of the vector is the number of generated time bins, and each of the elements of the vector comprises the generated raster density associated with the time bin; and
perform a regression to determine the function that describes the relationship between the time and the raster density based on the generated vector.

12. The system of claim 10, wherein the memory further comprises stored instructions executable by the processor that when executed cause the processor to:
receive, from a user device, a request to generate a density map of a particular location in the geographic area; and
generate an electronic map including the particular location based at least in part on the stored table.

13. The system of claim 12, wherein the method further comprises stored instructions executable by the processor that when executed cause the processor to transmit the generated electronic map for display to the user device.

14. The system of claim 10, wherein the memory further comprises stored instructions executable by the processor that when executed cause the processor to:
calculate, for each of the plurality of unit areas, a time-varying raster density based on a row in the stored table associated with the unit area; and
generate a time-lapse graphic for the geographic area using the calculated time-varying raster densities.

15. The system of claim 10, wherein storing the determined table comprises:
for each row in the table:
vectorize the coefficients in the row to produce a coefficient vector; and
compress the coefficient vector based on at least one of a deleted coefficient and a coefficient set to zero; and
store each compressed coefficient vector in conjunction with the corresponding unit area.

16. A computer program product embodied in a non-transitory computer readable storage medium and comprising computer instructions that when executed by a processor causes the processor to:
for a geographic area comprising a plurality of unit areas subdividing the geographic area:
receive records obtained from a plurality of reporting devices when the reporting devices were located within the geographic area, the records including the unit areas in which the reporting devices were located and time stamps indicating when the reporting device were located in those unit areas;
determine, for each of the plurality of unit areas, a relationship of raster density of the unit area as a function of time in a time window, wherein the raster density represents a density of records within the unit area and the relationship is represented by a vector of parameters each corresponding to a respective coefficient of the function;
generate a table, wherein each row of the table corresponds to a respective one of the plurality of unit areas, and each column of the table corresponds to a respective coefficient of the functions;
for at least one of the plurality of unit areas:
- determine that a particular coefficient of the function is below a threshold coefficient value, and
- responsive to determining that the particular coefficient is below the threshold coefficient value, perform at least one of setting the particular coefficient to zero and deleting the particular coefficient from the table; and store the determined table.

17. The non-transitory computer readable medium of claim 16, wherein the instructions to determine the functional relationship further comprises instructions that when executed by the processor cause the processor to:
determine a number of time bins within the time window;
for each of the number of time bins, generate a raster density associated with the unit area;
generate a vector, wherein the length of the vector is the number of generated time bins and each of the elements of the vector comprises the generated raster density associated with the time bin; and
perform a regression to determine the function that describes the relationship between the time and the raster density based on the generated vector.

18. The non-transitory computer readable medium of claim 16, wherein the memory further comprises stored instructions executable by the processor that when executed cause the processor to:
calculate, for each of the plurality of unit areas, a time-varying raster density based on a row in the stored table associated with the unit area; and
generate a time-lapse graphic for the geographic area using the calculated time-varying raster densities.

19. The non-transitory computer readable medium of claim 16, wherein storing the determined table comprises:
for each row in the table:
vectorize the coefficients in the row to produce a coefficient vector; and
compress the coefficient vector based on at least one of a deleted coefficient and a coefficient set to zero; and
store each compressed coefficient vector in conjunction with the corresponding unit area.

20. The non-transitory computer readable medium of claim 16, wherein the instructions further comprise instructions that when executed by the processor cause the processor to:
receive, from a user device, a request to generate a density map of a particular location in the geographic area; and
generate an electronic map including the particular location based at least in part on the stored table.

* * * * *